(12) United States Patent
Sunaga

(10) Patent No.: US 9,277,106 B2
(45) Date of Patent: Mar. 1, 2016

(54) IMAGE PICKUP LENS AND IMAGE PICKUP APPARATUS

(71) Applicant: Sony Corporation, Tokyo (JP)

(72) Inventor: Toshihiro Sunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 142 days.

(21) Appl. No.: 14/089,797

(22) Filed: Nov. 26, 2013

(65) Prior Publication Data

US 2014/0204265 A1 Jul. 24, 2014

(30) Foreign Application Priority Data

Jan. 18, 2013 (JP) ................................ 2013-007310

(51) Int. Cl.
  *G02B 9/34* (2006.01)
  *H04N 5/225* (2006.01)
  *G02B 15/173* (2006.01)
  *H04N 5/232* (2006.01)

(52) U.S. Cl.
  CPC ............ *H04N 5/2254* (2013.01); *G02B 15/173* (2013.01); *H04N 5/23209* (2013.01); *H04N 5/23212* (2013.01)

(58) Field of Classification Search
  CPC ........ G02B 15/14; G02B 15/16; G02B 15/20; G02B 9/34
  See application file for complete search history.

(56) References Cited

U.S. PATENT DOCUMENTS

2001/0043405 A1* 11/2001 Eguchi et al. ................. 359/685

FOREIGN PATENT DOCUMENTS

| JP | 06-337348 | 12/1994 |
| JP | 2009-058651 | 3/2009 |
| JP | 2012-068448 | 4/2012 |

* cited by examiner

*Primary Examiner* — Joseph P Martinez
(74) *Attorney, Agent, or Firm* — Hazuki International, LLC

(57) ABSTRACT

An image pickup lens includes: a first lens group having positive refractive power; a second lens group having negative refractive power; a third lens group having positive refractive power; and a fourth lens group having negative refractive power, arranged in order from an object side to an image side, the fourth lens group being configured to travel along an optical axis through focusing operation. In the image pickup lens, following conditional expression (1) is satisfied, $$f/f4 < -0.35 \qquad (1)$$

where f is a total focal length of the image pickup lens, and f4 is a focal length of the fourth lens group.

16 Claims, 13 Drawing Sheets

IMAGE PICKUP LENS AND IMAGE PICKUP APPARATUS

CROSS REFERENCE TO RELATED APPLICATIONS

This application claims the benefit of Japanese Priority Patent Application JP 2013-007310 filed Jan. 18, 2013, the entire contents of each which are incorporated herein by reference.

BACKGROUND

The present technology relates to technical fields of an image pickup lens and an image pickup apparatus. Specifically, the present technology relates to technical fields of an image pickup lens and an image pickup apparatus that have a shooting angle of view from about 40° to about 90° and F number of 2.8 or smaller.

Various types of bright lenses exist, for example, that have a shooting angle of view from about 40° to about 90° and F number of 2.8 or smaller for an image pickup apparatus with interchangeable lenses. As such a type of lens, a Gauss lens is widely known (for example, see Japanese Unexamined Patent Application Publication Nos. H06-337348 and 2009-58651 (JP H06-337348A and JP 2009-58651A)).

The Gauss lens has a configuration in which a convex lens and a concave lens are arranged symmetrically with an aperture stop in between. In the Gauss lens, whole of the lens system or part of lens groups travels along an optical axis at the time of focusing operation.

In recent years, digital cameras with interchangeable lenses have been rapidly in wide use. In particular, it has been possible to shoot moving images with the use of the image pickup apparatus with interchangeable lenses. Therefore, a lens suitable not only for shooting still images but for shooting moving images is desired. Accordingly, it is necessary to allow the lens group used for performing focusing operation to travel at high speed in accordance with rapid movement of a subject when shooting moving images.

The Gauss lenses disclosed in JP H06-337348A and JP 2009-58651A are each configured to allow whole of the lens system to travel along an optical axis at the time of focusing operation.

In a case where focusing operation is performed through allowing whole of the lens system to travel at high speed for shooting moving images in such a manner, weight of the focus lens group used for performing the focusing operation is increased. Therefore, an actuator for allowing the focusing lens groups to travel becomes large, and disadvantageously, a lens barrel becomes large.

On the other hand, an image pickup lens disclosed in Japanese Unexamined Patent Application Publication No. 2012-68448 (JP 2012-68448A) adopts rear-focus scheme. In the image pickup lens disclosed in JP 2012-68448A, a most-image-sided lens group is used as a focusing lens group, and thereby, focusing operation is achieved at high speed.

However, refractive power of the focusing lens group is set small in order to suppress variation in aberration during the focusing operation, and it is necessary to enlarge a traveling range of the focusing lens group accordingly. Therefore, an exit pupil becomes long, which disadvantageously prevents reduction in total length of the lens.

SUMMARY

Also, in an image pickup lens of an inner-focus scheme, the number of lenses in the focusing lens group is as less as 1 to 3. Therefore, in order to suppress variation in aberration during focusing operation, it is necessary to correct aberration to some degree by a lens group on the object side of the focusing lens group, and thereby, to reduce an angle of light ray that enters the focusing lens group.

However, when the angle of the light ray that enters the focusing lens group is reduced, a position of an exit pupil becomes away from image pickup plane. Therefore, a diameter of the image pickup lens is increased and a total length of the image pickup lens is increased.

Moreover, an incident angle of a light ray with respect to the image pickup plane is limited in order to suppress occurrence of false color, defect in color shading, etc. Also, there is a limitation in positioning the exit pupil close to the image pickup plane.

It is desirable to provide an image pickup lens and an image pickup apparatus that are capable of achieving reduction in total length of the lens while securing focusing operation at high speed.

According to an embodiment of the present technology, there is provided an image pickup lens including: a first lens group having positive refractive power; a second lens group having negative refractive power; a third lens group having positive refractive power; and a fourth lens group having negative refractive power, arranged in order from an object side to an image side, the fourth lens group being configured to travel along an optical axis through focusing operation. In the above-described image pickup lens, following conditional expression (1) is satisfied, $$f/f4 < -0.35 \quad (1)$$

where f is a total focal length of the image pickup lens, and f4 is a focal length of the fourth lens group.

Accordingly, in the image pickup lens, a traveling range of the fourth lens group serving as the focusing lens group becomes small, and an effect of allowing incident light rays to travel upward is increased.

In the above-described image pickup lens, following conditional expression (2) may be desirably satisfied, $$0.8 < f/f3 < 4.0 \quad (2)$$

where f3 is a focal length of the third lens group.

By allowing the image pickup lens to satisfy the conditional expression (2), the refractive power of the third lens group is set appropriate.

In the above-described image pickup lens, following conditional expression (3) may be desirably satisfied, $$-1.20 < f/f2 < -0.03 \quad (3)$$

where f2 is a focal length of the second lens group.

By allowing the image pickup lens to satisfy the conditional expression (3), the refractive power of the second lens group is set appropriate.

In the above-described image pickup lens, a most-object-sided face in the second lens group may desirably have a concave shape on the object side, and a most-image-sided face in the second lens group may desirably have a convex shape on the image side.

By allowing the most-object-sided face in the second lens group to have a concave shape facing toward the object plane, and allowing the most-image-sided face in the second lens group to have a convex shape facing toward the image plane, incident light rays having high image height are allowed to travel upward at a position closer to the object plane.

In the above-described image pickup lens, the second lens group may desirably include a plurality of meniscus lenses.

By allowing the second lens group to include the plurality of meniscus lenses, aberration is suppressed by the respective meniscus lenses.

In the above-described image pickup lens, following conditional expression (4) may be desirably satisfied, $$0.3 < f/f1 < 1.0 \tag{4}$$

where f1 is a focal length of the first lens group.

By allowing the image pickup lens to satisfy the conditional expression (4), the refractive power of the first lens group is set appropriate.

In the above-described image pickup lens, the third lens group may desirably include an aspherical lens having positive refractive power.

By allowing the third lens group to include the aspherical lens having positive refractive power, various types of aberration are suppressed by the aspherical lens.

In the above-described image pickup lens, the fourth lens group may desirably consist essentially of one negative lens.

By allowing the fourth lens group to consist essentially of one negative lens, weight of the focusing lens group is reduced.

According to an embodiment of the present technology, there is provided an image pickup apparatus with an image pickup lens and an image pickup device, the image pickup device being configured to convert an optical image formed by the image pickup lens into an electric signal, the image pickup lens including: a first lens group having positive refractive power; a second lens group having negative refractive power; a third lens group having positive refractive power; and a fourth lens group having negative refractive power, arranged in order from an object side to an image side, the fourth lens group being configured to travel along an optical axis through focusing operation. In the above-described image pickup lens, following conditional expression (1) is satisfied, $$f/f4 < -0.35 \tag{1}$$

where f is a total focal length of the image pickup lens, and f4 is a focal length of the fourth lens group.

Accordingly, in the image pickup apparatus, a traveling range of the fourth lens group serving as the focusing lens group becomes small, and an effect of allowing incident light rays to travel upward is increased.

The image pickup lens according to the above-described embodiment of the present technology includes: the first lens group having positive refractive power; the second lens group having negative refractive power; the third lens group having positive refractive power; and the fourth lens group having negative refractive power, arranged in order from the object side to the image side, the fourth lens group being configured to travel along an optical axis through focusing operation. In the image pickup lens according to the above-described embodiment of the present technology, the following conditional expression (1) is satisfied, $$f/f4 < -0.35 \tag{1}$$

where f is the total focal length of the image pickup lens, and f4 is the focal length of the fourth lens group.

Accordingly, reduction in total length of the lens is achieved while securing focusing operation at high speed.

In the image pickup lens according to one embodiment of the present technology, the following conditional expression (2) is satisfied, $$0.8 < f/f3 < 4.0 \tag{2}$$

where f3 is the focal length of the third lens group.

Accordingly, an angle of light that enters the focusing lens group is reduced, and occurrence of spherical aberration is suppressed effectively.

In the image pickup lens according to one embodiment of the present technology, the following conditional expression (3) is satisfied, $$-1.20 < f/f2 < -0.03 \tag{3}$$

where f2 is the focal length of the second lens group.

Accordingly, the incident light rays are allowed to travel upward, and thereby, variation in focusing operation is suppressed. Also, occurrence of astigmatism is suppressed effectively.

In the image pickup lens according to one embodiment of the present technology, the most-object-sided face in the second lens group has a concave shape on the object side, and the most-image-sided face in the second lens group has a convex shape on the image side.

Accordingly, occurrence of aberration is suppressed, and incident light rays having high image height are allowed to travel upward at a position closer to the object plane. Therefore, reduction in total length of the lens is achieved.

In the image pickup lens according to one embodiment of the present technology, the second lens group includes the plurality of meniscus lenses.

Accordingly, occurrence of aberration is suppressed effectively.

In the image pickup lens according to one embodiment of the present technology, the following conditional expression (4) is satisfied, $$0.3 < f/f1 < 1.0 \tag{4}$$

where f1 is the focal length of the first lens group.

Accordingly, incident light rays having high image height are allowed to travel upward at a position closer to the object plane by the first lens group, and therefore, reduction in total length of the lens is achieved. Also, occurrence of field curvature is suppressed effectively.

In the image pickup lens according to one embodiment of the present technology, the third lens group includes an aspherical lens having positive refractive power.

Accordingly, various types of aberration are suppressed by the aspherical lens, and optical performance of the image pickup lens is improved.

In the image pickup lens according to one embodiment of the present technology, the fourth lens group consists essentially of one negative lens.

Accordingly, the weight of the focusing lens group is reduced, and focusing operation is performed at higher speed.

The image pickup apparatus according to the above-described embodiment of the present technology includes the image pickup lens and the image pickup device, the image pickup device being configured to convert an optical image formed by the image pickup lens into an electric signal. The image pickup lens includes: the first lens group having positive refractive power; the second lens group having negative refractive power; the third lens group having positive refractive power; and the fourth lens group having negative refractive power, arranged in order from the object side to the image side, the fourth lens group being configured to travel along the optical axis through focusing operation. In the above-described image pickup lens, the following conditional expression (1) is satisfied, $$f/f4 < -0.35 \tag{1}$$

where f is a total focal length of the image pickup lens, and f4 is a focal length of the fourth lens group.

Accordingly, reduction in total length of the lens is achieved while securing focusing operation at high speed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
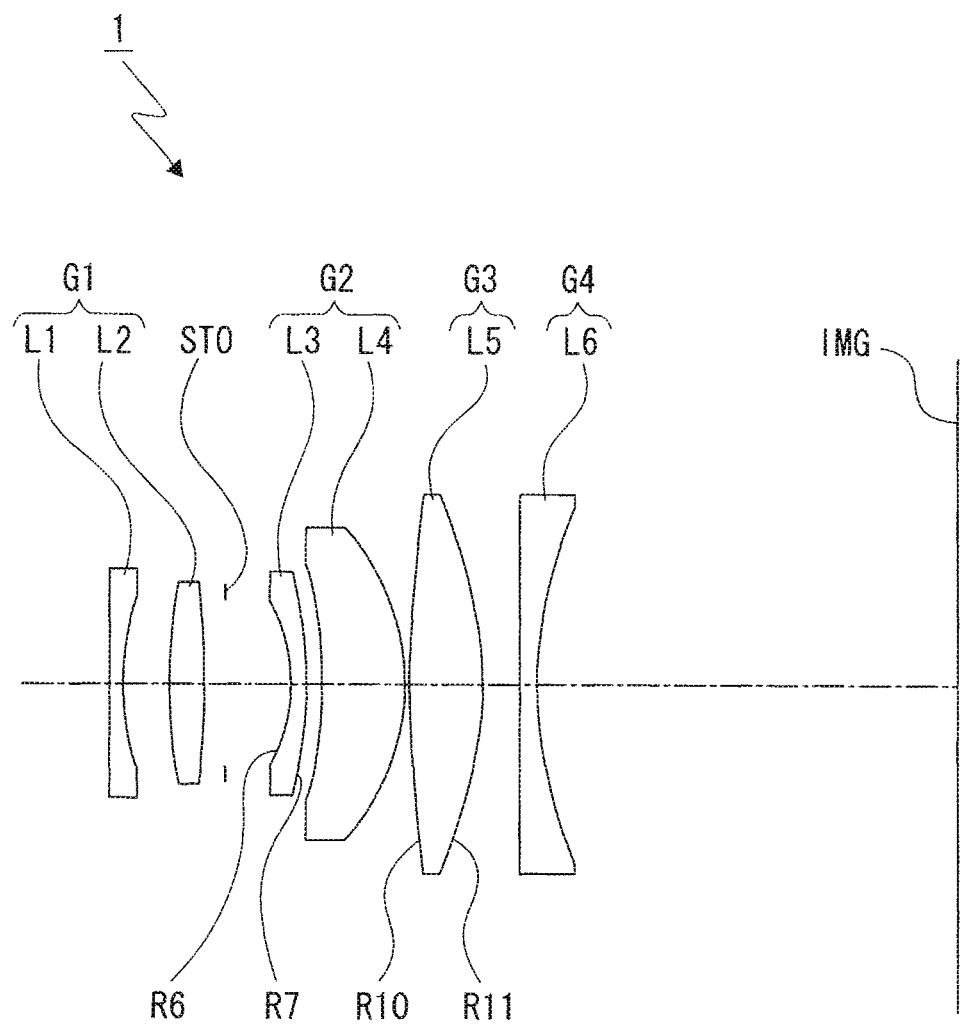
FIG. 1 illustrates an image pickup lens and an image pickup apparatus according to some embodiments of the present technology together with FIGS. 2 to 13, and illustrates a lens configuration of an image pickup lens according to a first embodiment.

An image pickup lens and an image pickup apparatus according to some embodiments of the present technology will be described below.

[Configuration of Image Pickup Lens]

An image pickup lens according to an embodiment of the present technology includes: a first lens group having positive refractive power;

a second lens group having negative refractive power; a third lens group having positive refractive power; and a fourth lens group having negative refractive power, arranged in order from an object side to an image side. The fourth lens group is configured to travel along an optical axis through focusing operation.

In such a manner, the image pickup lens according to the present embodiment of the technology adopts rear-focus scheme, and whole of the image pickup lens does not travel along the optical axis but the fourth lens group travels along the optical axis through the focusing operation. Therefore, weight of the focusing lens group is light. Also, an actuator for allowing the focusing lens group to travel is small. Therefore, the focusing operation is achieved at high speed, and reduction in size is achieved.

Moreover, the image pickup lens according to the present embodiment of the technology satisfies the following conditional expression (1), $$f/f4 < -0.35 \qquad (1)$$

where f is a total focal length of the image pickup lens, and f4 is a focal length of the fourth lens group.

The conditional expression (1) defines a ratio between the total focal length of the image pickup lens and the focal length of the fourth lens group.

When a value of f/f4 is larger than the upper limit in the conditional expression (1), the negative refractive power of the fourth lens group is excessively weak. Therefore, the traveling range of the fourth lens group serving as the focusing lens group becomes large. Also, a degree of allowing the incident light rays to travel upward becomes small. Accordingly, the total length of the image pickup lens becomes disadvantageously large.

Accordingly, by allowing the image pickup lens to satisfy the conditional expression (1), the traveling range of the fourth lens group serving as the focusing lens group becomes small. Also, the effect of allowing the incident light rays to travel upward is increased. Accordingly, reduction in total length of the image pickup lens is achieved while securing focusing operation at high speed.

In the image pickup lens according to the present embodiment of the technology, the following conditional expression (2) may be desirably satisfied, $$0.8 < f/f3 < 4.0 \qquad (2)$$

where f3 is a focal length of the third lens group.

The conditional expression (2) defines a ratio between the total focal length of the image pickup lens and the focal length of the third lens group.

When a value of f/f3 is smaller than the lower limit in the conditional expression (2), the positive refractive power of the third lens group becomes excessively weak. Therefore, the effect of the third lens group which allows the light, having traveled upward by the second lens group, to be close to parallel light is degraded. Accordingly, an angle of light that enters the fourth lens group serving as the focusing lens group is not reduced.

On the other hand, when the value of f/f3 is larger than the upper limit in the conditional expression (2), the refractive power of the third lens group becomes excessively strong. Therefore, spherical aberration occurs easily.

Accordingly, by allowing the image pickup lens to satisfy the conditional expression (2), the refractive power of the third lens group is set appropriate. Therefore, the angle of light that enters the focusing lens group is reduced, and occurrence of spherical aberration is suppressed effectively.

It is to be noted that, in the image pickup lens, the numerical range of the conditional expression (2) may be preferably set as the following conditional expression (2)'.

$$1.0 < f/f3 < 2.5 \quad (2)'$$

By allowing the image pickup lens to satisfy the conditional expression (2)', the refractive power of the third lens group is set further appropriate. Therefore, the angle of light that enters the focusing lens group is reduced sufficiently, and occurrence of spherical aberration is suppressed more effectively.

In the image pickup lens according to the present embodiment of the present technology, the following conditional expression (3) may be desirably satisfied, $$-1.20 < f/f2 < -0.03 \quad (3)$$

where f2 is a focal length of the second lens group.

The conditional expression (3) defines a ratio between the total focal length of the image pickup lens and the focal length of the second lens group.

When a value of f/f2 is larger than the upper limit in the conditional expression (3), the negative refractive power of the second lens group becomes excessively weak. Therefore, a degree of allowing the incident light rays to travel upward becomes small. Accordingly, variation in the focusing operation is not allowed to be suppressed.

On the other hand, when the value of f/f2 is smaller than the lower limit in the conditional expression (3), the negative refractive power in the second lens group becomes excessively strong. Therefore, astigmatism occurs easily.

Accordingly, by allowing the image pickup lens to satisfy the conditional expression (3), the refractive power of the second lens group is set appropriate. Therefore, the incident light rays are allowed to travel upward, and thereby, variation in focusing operation is suppressed. Also, occurrence of astigmatism is suppressed effectively.

It is to be noted that, in the image pickup lens, the numerical range of the conditional expression (3) may be preferably set as the following conditional expression (3)'.

$$-0.8 < f/f2 < -0.05 \quad (3)'$$

By allowing the image pickup lens to satisfy the conditional expression (3)', the incident light rays are allowed to travel upward, and thereby, variation in focusing operation is suppressed sufficiently. Also, occurrence of astigmatism is suppressed more effectively.

In the image pickup lens according to the present embodiment of the technology, the most-object-sided face in the second lens group may desirably have a concave shape on the object side, and the most-image-sided face in the second lens group may desirably have a convex shape on the image side.

By allowing the most-object-sided face in the second lens group to have a concave shape on the object side, and allowing the most-image-sided face in the second lens group to have a convex shape on the image side, occurrence of aberration is suppressed, and incident light rays having high image height is allowed to travel upward at a position closer to the object plane. Accordingly, reduction in total length of the image pickup lens is achieved.

In the image pickup lens according to the present embodiment of the technology, the second lens group may desirably include a plurality of meniscus lenses.

By allowing the second lens group to include the plurality of meniscus lenses, occurrence of aberration is suppressed effectively.

In the image pickup lens according to the present embodiment of the technology, the following conditional expression (4) may be desirably satisfied, $$0.3 < f/f1 < 1.0 \quad (4)$$

where f1 is a focal length of the first lens group.

The conditional expression (4) defines a ratio between the total focal length of the image pickup lens and the focal length of the first lens group.

When a value of f/f1 is smaller than the lower limit in the conditional expression (4), the positive refractive power of the first lens group becomes excessively weak. Therefore, a degree of allowing the incident light rays to travel upward becomes small.

On the other hand, when the value of f/f1 is larger than the upper limit in the conditional expression (4), field curvature occurs easily.

Accordingly, by allowing the image pickup lens to satisfy the conditional expression (4), the refractive power of the first lens group is set appropriate. Therefore, incident light rays having high image height are allowed to travel upward at a position closer to the object plane by the first lens group. Accordingly, reduction in total length of the image pickup lens is achieved. Also, occurrence of field curvature is suppressed effectively.

In the image pickup lens according to the present embodiment of the technology, the third lens group may desirably include an aspherical lens having positive refractive power.

By allowing the third lens group to include the aspherical lens having positive refractive power, various types of aberration are suppressed by the aspherical lens in the image pickup lens according to the present embodiment of the technology in which light rays are sharply bent at the third lens group. Accordingly, optical performance of the image pickup lens is improved.

In the image pickup lens according to the present embodiment of the technology, the fourth lens group may desirably consist essentially of one negative lens.

By allowing the fourth lens group to consist essentially of one negative lens, weight of the focusing lens group is reduced. Accordingly, the focusing operation is achieved at higher speed.

[Numerical Examples of Image Pickup Lens]

Description will be given below, referring to the drawings and tables, of an image pickup lens according to a specific but not limitative embodiment of the present technology and numerical examples in which specific but not limitative numerical values are applied to the above-described embodiments.

It is to be noted that symbols etc. in the respective tables and the description below represent the following.

"Face number" represents the number of an i-th face counted from the object plane side toward the image plane side. "R" represents a value of a paraxial curvature radius of the i-th surface. "D" represents a value of a spacing (a thickness at the center of the lens or an air spacing) along the optical axis between the i-th face and the (i+1)th face. "Nd" represents a value of a refractive index of the d line ($\lambda$=587.6 nm) of a lens etc. beginning from the i-th face. "vd" represents a value of an Abbe number of the d line of the lens etc. beginning from the i-th face.

Concerning "face number", "ASP" indicates that the face is aspherical, and "STO" indicates that the face is an aperture stop. Concerning "R", "infinity" indicates that the face is a planar face.

Concerning "D", "Di" indicates that the spacing is variable.

"κ" represents a conic constant. "A4", "A6", "A8", and "A10" represent aspherical face coefficients of 4th order, 6th order, 8th order, and 10th order, respectively.

"f" represents the total focal length of the lens, "Fno" represents F number, "ω" represents a half angle of view, and "β" represents shooting magnification.

In respective tables below showing the aspherical face coefficients, "E-n" is an exponential expression having 10 as a base. In other words, "E-n" represents "$10^{-n}$". To give an example, "0.12345E-05" represents "$0.12345 \times 10^{-5}$".

The image pickup lenses according to the above-described embodiments each include a lens face that is aspherical. The shape of the aspherical face is defined by the following Expression 1 where "x" is a distance (sag amount) from a vertex of the lens face along the optical axis, "y" is a height (image height) in a direction perpendicular to the optical axis direction, "c" is a paraxial curvature (reciprocal of curvature radius) at the vertex of the lens, "κ" is a conic constant, and "Ai" is a face coefficient of i-th order (i=4, 6, 8, 10).

$$x = \frac{cy^2}{1 + \{1 - (1+\kappa)c^2 y^2\}^{1/2}} + \sum Ai \cdot yi \quad \text{(Expression 1)}$$

Each of image pickup lenses 1 to 4 according to first to fourth embodiments described below includes: a first lens group G1 having positive refractive power; a second lens group G2 having negative refractive power; a third lens group G3 having positive refractive power; and a fourth lens group G4 having negative refractive power, arranged in order from an object side to an image side. The fourth lens group G4 serves as a focusing lens group that is configured to travel along an optical axis through focusing operation.

First Embodiment

FIG. 1 illustrates a lens configuration of the image pickup lens 1 according to the first embodiment of the present technology.

The first lens group G1 is configured of a first lens L1 and a second lens L2 arranged in order from the object side to the image side. The first lens L1 has a meniscus shape with a convex face on the object side, and has negative refractive power. The second lens L2 has a biconvex shape, and has positive refractive power.

The second lens group G2 is configured of a third lens L3 and a fourth lens L4 arranged in order from the object side to the image side. The third lens L3 has a meniscus shape with a concave face on the object side, and has negative refractive power. The fourth lens L4 has a meniscus shape with a convex face on the image side, and has positive refractive power.

The third lens group G3 is configured of a fifth lens L5. The fifth lens L5 has a biconvex shape, and has positive refractive power.

The fourth lens group G4 is configured of a sixth lens L6. The sixth lens L6 has a meniscus shape with a convex face on the object side, and has negative refractive power.

An aperture stop STO is arranged between the first lens group G1 and the second lens group G2.

An image plane IMG is placed on the image side of the fourth lens group G4.

Table 1 shows lens data of Numerical Example 1 in which specific numerical values are applied to the image pickup lens 1 according to the first embodiment.

TABLE 1

| Face number | R | D | Nd | νd |
|---|---|---|---|---|
| 1 | 236518.2 | 0.65 | 1.488 | 70.44 |
| 2 | 13.68 | 2.12 | | |
| 3 | 22.10 | 1.55 | 1.773 | 49.62 |
| 4 | −46.02 | 1 | | |
| 5 (STO) | infinity | 3.02 | | |
| 6 (ASP) | −7.54 | 0.76 | 1.821 | 24.06 |
| 7 (ASP) | −16.25 | 0.63 | | |
| 8 | −22.51 | 3.86 | 1.729 | 54.67 |
| 9 | −10.59 | 0.2 | | |
| 10 (ASP) | 42.68 | 3.40 | 1.821 | 42.71 |
| 11 (ASP) | −18.96 | D11 | | |
| 12 | 345.16 | 0.85 | 1.805 | 25.46 |
| 13 | 19.628 | D13 | | |

In the image pickup lens 1, both faces (a sixth face and a seventh face) of the third lens L3 in the second lens group G2 and both faces (a tenth face and an eleventh face) of the fifth lens L5 in the third lens group G3 are aspherical. Table 2 shows values of the 4th-order, 6th-order, 8th-order, and 10th-order aspherical face coefficients A4, A6, A8, and A10 of the aspherical faces in Numerical Example 1 together with values of the conic constants κ.

TABLE 2

| Face number | κ | A4 | A6 | A8 | A10 |
|---|---|---|---|---|---|
| 6 | −1.6936 | −1.6827E−04 | −4.7832E−07 | −4.2364E−07 | 5.6542E−09 |
| 7 | 0.0000 | 2.3987E−04 | 2.2947E−07 | −1.9253E−07 | 2.7918E−09 |
| 10 | 0.0000 | −9.9471E−05 | 4.3063E−07 | 6.9506E−09 | −2.2838E−11 |
| 11 | 0.0000 | −1.5205E−05 | −1.6110E−07 | 8.2102E−09 | 1.5459E−11 |

Table 3 shows values of F number Fno, a total focal length f of the image pickup lens, and a half angle of view ω in Numerical Example 1. Table 3 also shows values of shooting magnification β and variable spacing in a condition that the image pickup lens is in focus on an object at infinite distance and in a condition that the image pickup lens is in focus on an object at a short distance in Numerical Example 1.

TABLE 3

| | Focus on object at infinite distance | Focus on object at short distance |
|---|---|---|
| Fno | 2.92 | — |
| f | 20.51 | — |
| ω | 35.93 | — |
| β | 0.000 | −0.078 |
| D11 | 1.67 | 2.41 |
| D13 | 19.52 | 18.78 |

Figure 2:
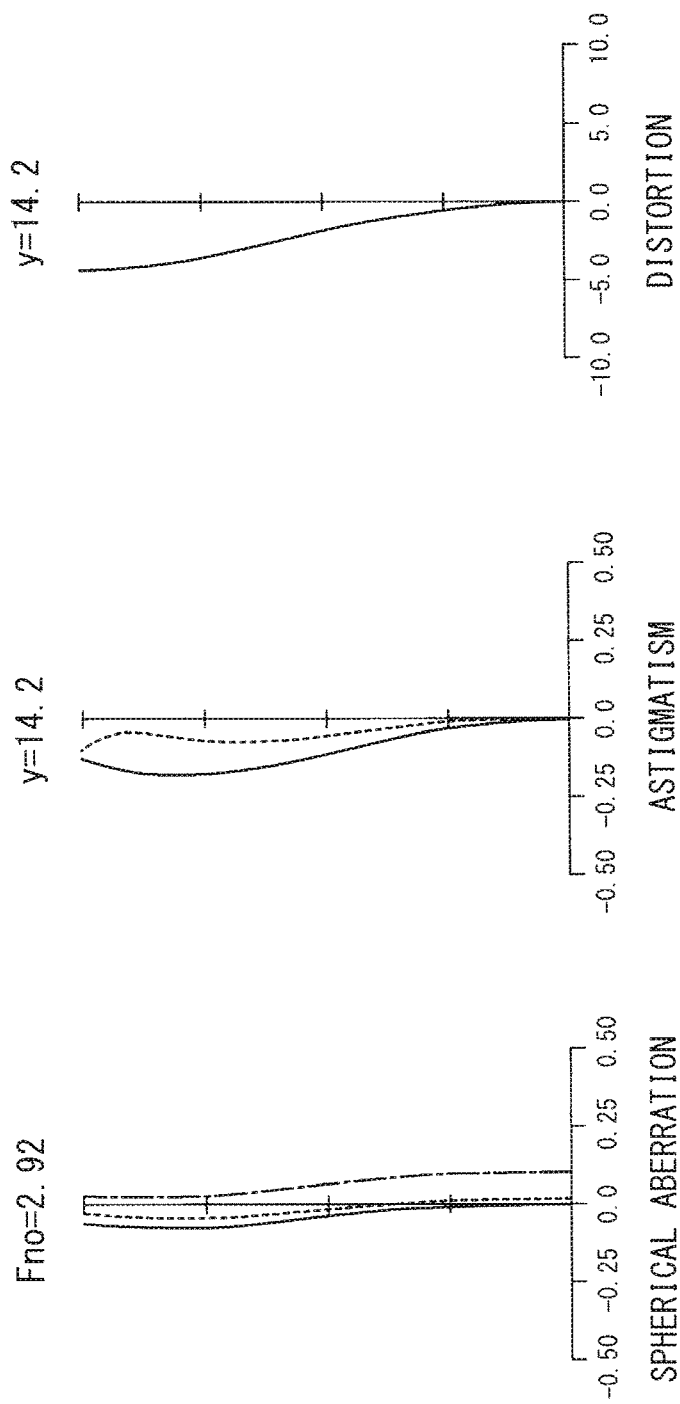
FIG. 2 is a diagram illustrating spherical aberration, astigmatism, and distortion in a condition that the image pickup lens is in focus on an object at infinite distance in a numerical example in which specific numerical values are applied to the first embodiment.
Figure 3:
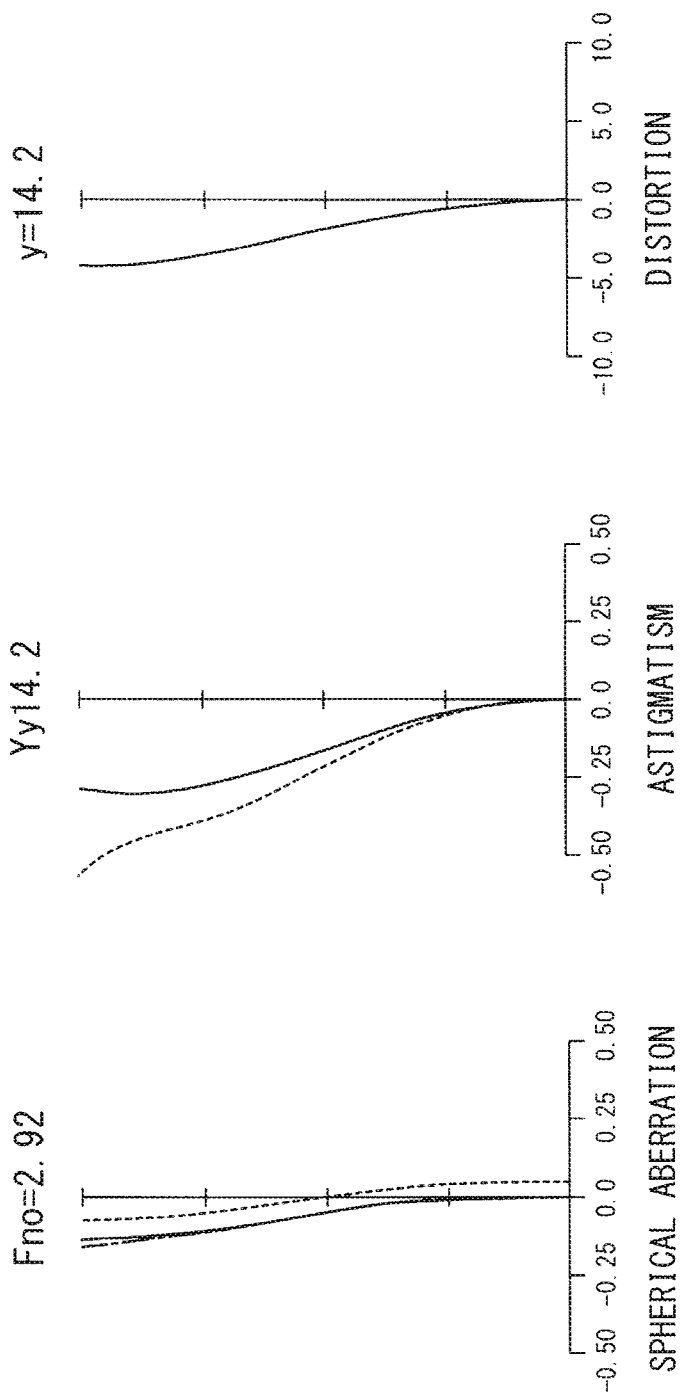
FIG. 3 is a diagram illustrating spherical aberration, astigmatism, and distortion in a condition that the image pickup lens is in focus on an object at a short distance in the numerical example in which the specific numerical values are applied to the first embodiment.

FIG. 2 illustrates spherical aberration, astigmatism, and distortion in a condition that the image pickup lens is in focus on an object at infinite distance in Numerical Example 1. FIG. 3 illustrates spherical aberration, astigmatism, and distortion in a condition that the image pickup lens is in focus on an object at a short distance in Numerical Example 1.

In FIGS. 2 and 3, a solid line in the diagram of spherical aberration shows values of the d line (587.56 nm), a solid line in the diagram of astigmatism shows values in a sagittal image plane of the d line, a dashed line in the diagram of astigmatism shows values in a meridional image plane of the d line, and values of the d line are shown in the diagram of distortion. "y" represents an image height in the diagrams of astigmatism and distortion.

As can be clearly seen from the respective aberration diagrams, various types of aberration are favorably corrected in Numerical Example 1, and the image pickup lens in Numerical Example 1 has superior imaging performance.

TABLE 4-continued

| Face number | R | D | Nd | vd |
|---|---|---|---|---|
| 8 (ASP) | 20.82 | 4.50 | 1.821 | 42.71 |
| 9 (ASP) | −20.92 | D9 | | |
| 10 | −137.97 | 0.85 | 1.847 | 23.78 |
| 11 | 21.11 | D14 | | |

In the image pickup lens 2, both faces (a first face and a second face) of the first lens L1 in the first lens group G1, both faces (a fourth face and a fifth face) of the second lens L2 in the second lens group G2, and both faces (an eighth face and a ninth face) of the fourth lens L4 in the third lens group G3 are aspherical. Table 5 shows values of the 4th-order, 6th-order, 8th-order, and 10th-order aspherical face coefficients A4, A6, A8, and A10 of the aspherical faces in Numerical Example 2 together with values of the conic constants κ.

TABLE 5

| Face number | κ | A4 | A6 | A8 | A10 |
|---|---|---|---|---|---|
| 1 | 0.0000 | −1.4483E−04 | −1.2417E−05 | 1.7909E−07 | −2.3036E−08 |
| 2 | 0.0000 | −2.1682E−04 | −1.0593E−05 | −2.0068E−07 | −9.3799E−09 |
| 4 | 0.2059 | −2.3613E−04 | 5.5588E−06 | −6.0342E−08 | −1.2556E−08 |
| 5 | 0.0000 | −4.1063E−04 | 8.9373E−06 | −2.0856E−07 | 2.0976E−09 |
| 8 | 1.5894 | −9.6629E−05 | 1.7726E−07 | −1.8341E−09 | 1.0548E−11 |
| 9 | 0.0000 | 6.9063E−05 | −2.7205E−07 | 7.8691E−10 | 1.2240E−11 |

Second Embodiment

Figure 4:
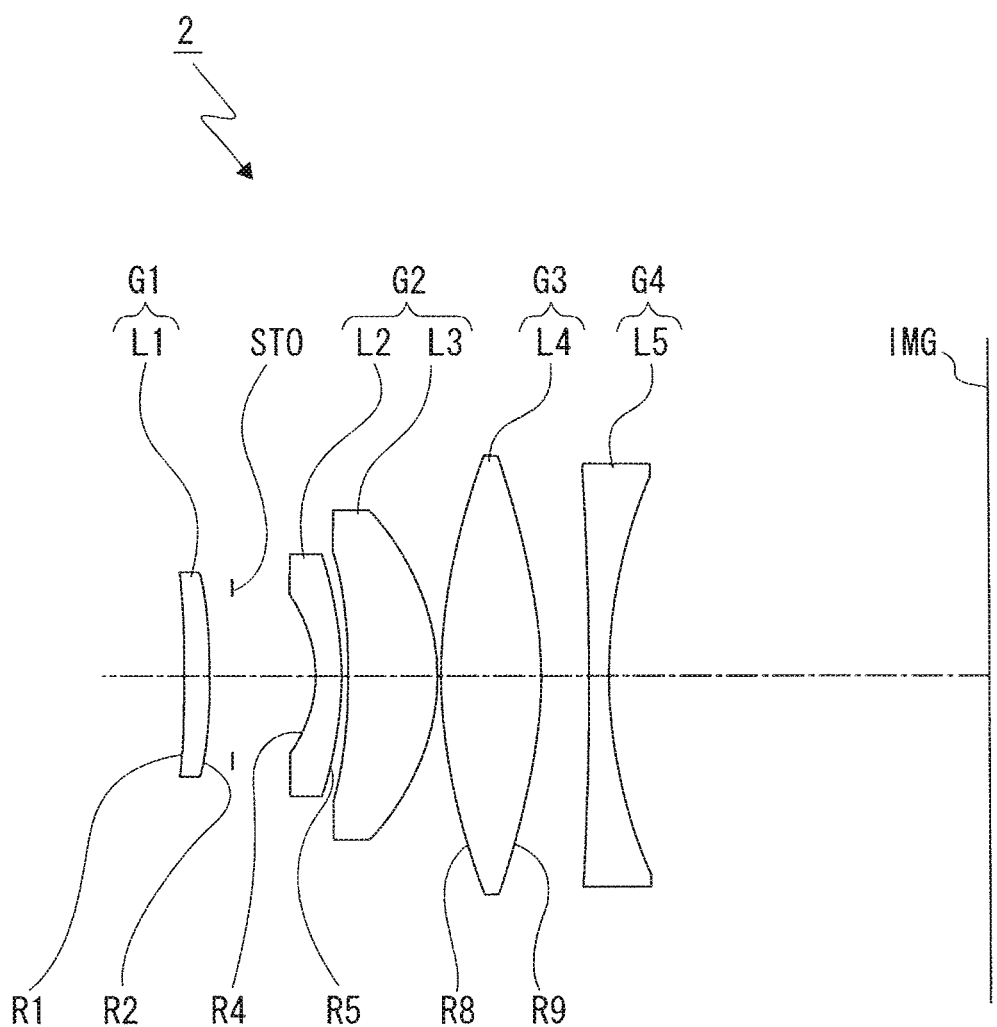
FIG. 4 is a diagram illustrating a lens configuration of an image pickup lens according to a second embodiment.

FIG. 4 illustrates a lens configuration of the image pickup lens 2 according to the second embodiment of the present technology.

The first lens group G1 is configured of a first lens L1. The first lens L1 has a meniscus shape with a concave face on the object side, and has positive refractive power.

The second lens group G2 is configured of a second lens L2 and a third lens L3 arranged in order from the object side to the image side. The second lens L2 has a meniscus shape with a concave face on the object side, and has negative refractive power. The third lens L3 has a meniscus shape with a convex face on the image side, and has positive refractive power.

The third lens group G3 is configured of a fourth lens L4. The fourth lens L4 has a biconvex shape, and has positive refractive power.

The fourth lens group G4 is configured of a fifth lens L5. The fifth lens L5 has a biconcave shape, and has negative refractive power.

An aperture stop STO is arranged between the first lens group G1 and the second lens group G2.

An image plane IMG is placed on the image side of the fourth lens group G4.

Table 4 shows lens data of Numerical Example 2 in which specific numerical values are applied to the image pickup lens 2 according to the second embodiment.

TABLE 4

| Face number | R | D | Nd | vd |
|---|---|---|---|---|
| 1 (ASP) | −1022.39 | 1.14 | 1.729 | 54.04 |
| 2 (ASP) | −35.21 | 1.06 | | |
| 3 (STO) | infinity | 3.75 | | |
| 4 (ASP) | −6.33 | 1.10 | 1.689 | 31.16 |
| 5 (ASP) | −21.32 | 0.35 | | |
| 6 | −22.09 | 4.00 | 1.729 | 54.67 |
| 7 | −10.12 | 0.20 | | |

Table 6 shows values of F number Fno, a total focal length f of the image pickup lens, and a half angle of view ω in Numerical Example 2. Table 6 also shows shooting magnification β and variable spacing in a condition that the image pickup lens is in focus on an object at infinite distance and in a condition that the image pickup lens is in focus on an object at a short distance in Numerical Example 2.

TABLE 6

| | Focus on object at infinite distance | Focus on object at short distance |
|---|---|---|
| Fno | 2.88 | — |
| f | 20.60 | — |
| ω | 35.42 | — |
| β | 0.000 | −0.077 |
| D9 | 1.20 | 1.82 |
| D14 | 18.29 | 17.67 |

Figure 5:
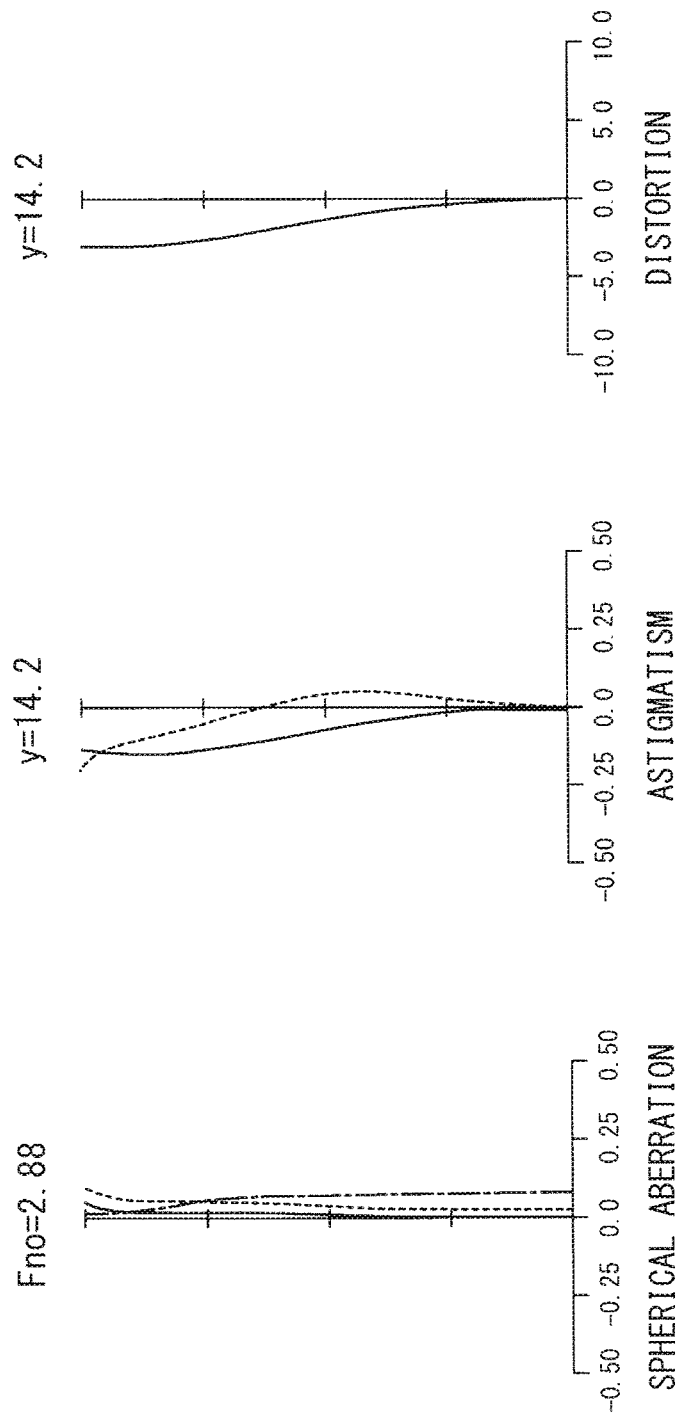
FIG. 5 is a diagram illustrating spherical aberration, astigmatism, and distortion in a condition that the image pickup lens is in focus on an object at infinite distance in a numerical example in which specific numerical values are applied to the second embodiment.
Figure 6:
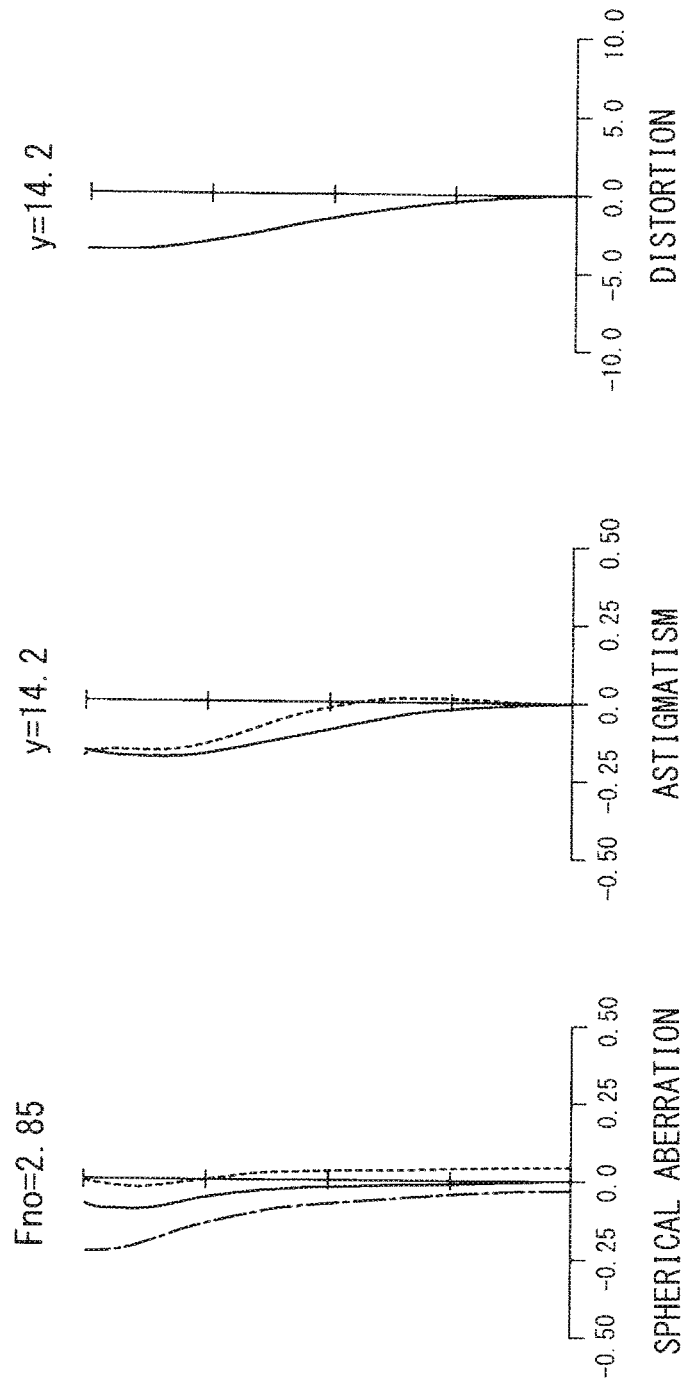
FIG. 6 is a diagram illustrating spherical aberration, astigmatism, and distortion in a condition that the image pickup lens is in focus on an object at a short distance in the numerical example in which the specific numerical values are applied to the second embodiment.

FIG. 5 illustrates spherical aberration, astigmatism, and distortion in a condition that the image pickup lens is in focus on an object at infinite distance in Numerical Example 2. FIG. 6 illustrates spherical aberration, astigmatism, and distortion in a condition that the image pickup lens is in focus on an object at a short distance in Numerical Example 2.

In FIGS. 5 and 6, a solid line in the diagram of spherical aberration shows the values of the d line (587.56 nm), a solid line in the diagram of astigmatism shows values in a sagittal image plane of the d line, a dashed line in the diagram of astigmatism shows values in a meridional image plane of the d line, and values of the d line are shown in the diagram of distortion. "y" represents an image height in the diagrams of astigmatism and distortion.

As can be clearly seen from the respective aberration diagrams, various types of aberration are favorably corrected in Numerical Example 2, and the image pickup lens in Numerical Example 2 has superior imaging performance.

Third Embodiment

Figure 7:
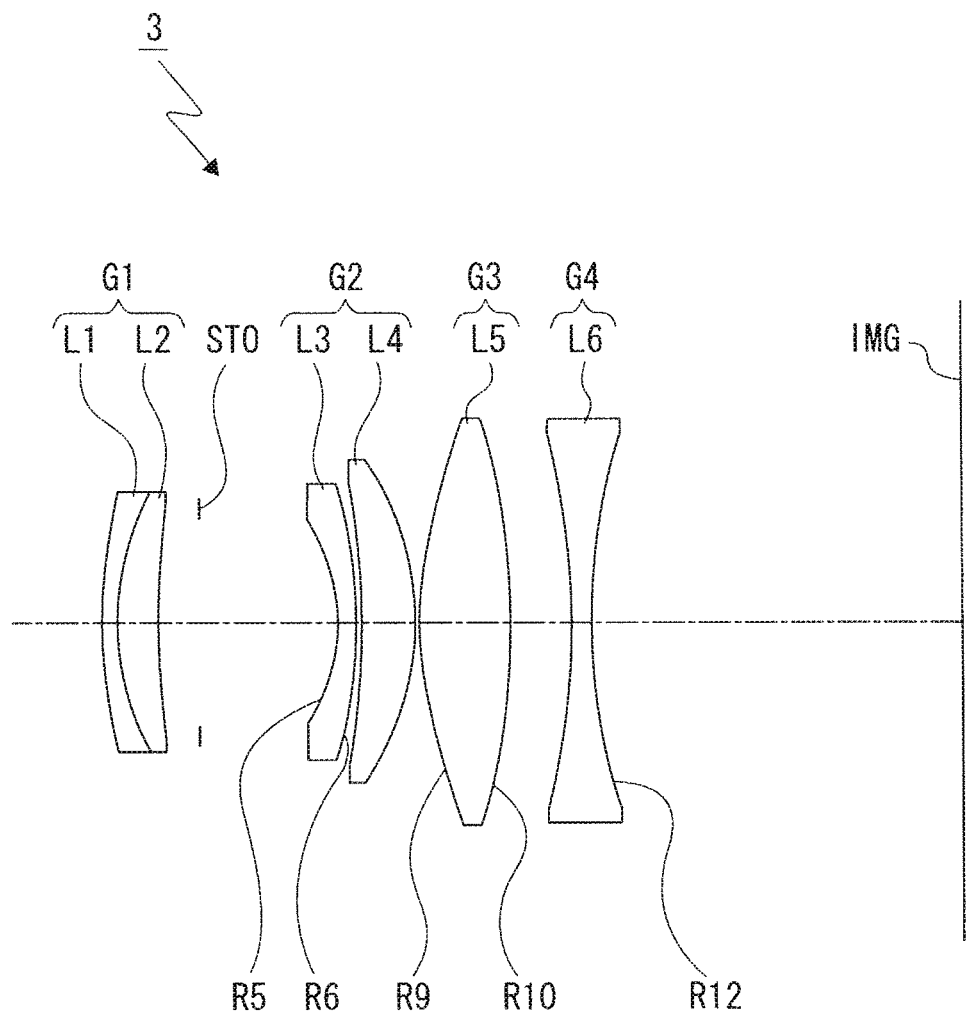
FIG. 7 is a diagram illustrating a lens configuration of an image pickup lens according to a third embodiment.

FIG. 7 illustrates a lens configuration of the image pickup lens 3 according to the third embodiment of the present technology.

The first lens group G1 is configured of a first lens L1 and a second lens L2 that are arranged in order from the object side to the image side and are cemented to each other. The first lens L1 has a meniscus shape with a convex face on the object side, and has negative refractive power. The second lens L2 has a meniscus shape with a convex face on the object side, and has positive refractive power.

The second lens group G2 is configured of a third lens L3 and a fourth lens L4 arranged in order from the object side to the image side. The third lens L3 has a meniscus shape with a concave face on the object side, and has negative refractive power. The fourth lens L4 has a meniscus shape with a convex face on the image side, and has positive refractive power.

The third lens group G3 is configured of a fifth lens L5. The fifth lens L5 has a biconvex shape, and has positive refractive power.

The fourth lens group G4 is configured of a sixth lens L6. The sixth lens L6 has a biconcave shape, and has negative refractive power.

An aperture stop STO is arranged between the first lens group G1 and the second lens group G2.

An image plane IMG is placed on the image side of the fourth lens group G4.

Table 7 shows lens data of Numerical Example 3 in which specific numerical values are applied to the image pickup lens 3 according to the third embodiment.

TABLE 7

| Face number | R | D | Nd | νd |
|---|---|---|---|---|
| 1 | 20.79 | 0.75 | 1.617 | 31.00 |
| 2 | 12.24 | 1.73 | 1.773 | 49.62 |
| 3 | 35.70 | 1.82 | | |
| 4 (STO) | infinity | 6.20 | | |
| 5 (ASP) | −7.33 | 0.75 | 1.689 | 31.16 |
| 6 (ASP) | −28.75 | 0.30 | | |
| 7 | −32.58 | 2.34 | 1.773 | 49.62 |
| 8 | −12.69 | 0.20 | | |
| 9 (ASP) | 14.79 | 4.05 | 1.773 | 49.46 |
| 10 (ASP) | −23.15 | D10 | | |
| 11 | −36.07 | 0.85 | 1.821 | 42.70 |
| 12 (ASP) | 23.88 | D12 | | |

In the image pickup lens 3, both faces (a fifth face and a sixth face) of the third lens L3 in the second lens group G2, both faces (a ninth face and a tenth face) of the fifth lens L5 in the third lens group G3, and a face (a twelfth face) of the sixth lens L6 in the fourth lens group G4 are aspherical. Table 8 shows values of the 4th-order, 6th-order, 8th-order, and 10th-order aspherical face coefficients A4, A6, A8, and A10 of the aspherical faces in Numerical Example 3 together with values of the conic constants κ.

TABLE 8

| Face number | κ | A4 | A6 | A8 | A10 |
|---|---|---|---|---|---|
| 5 | −1.0879 | −2.3698E−04 | 1.6090E−05 | −5.8006E−07 | 8.7765E−09 |
| 6 | 0.0000 | −4.8513E−04 | 1.8175E−05 | −3.9395E−07 | 4.1330E−09 |
| 9 | 0.2115 | −1.6322E−04 | 5.7318E−07 | −1.3319E−08 | 4.8852E−11 |
| 10 | 0.0000 | 3.8232E−04 | −7.9918E−06 | 7.9310E−08 | −3.5939E−10 |
| 12 | 0.0000 | −1.6801E−04 | 4.7996E−06 | −6.2591E−08 | 2.9945E−10 |

Table 9 shows values of F number Fno, a total focal length f of the image pickup lens, and a half angle of view ω in Numerical Example 3. Table 9 also shows shooting magnification β and variable spacing in a condition that the image pickup lens is in focus on an object at infinite distance and in a condition that the image pickup lens is in focus on an object at a short distance in Numerical Example 3.

TABLE 9

| | Focus on object at infinite distance | Focus on object at short distance |
|---|---|---|
| Fno | 2.87 | — |
| f | 28.13 | — |
| ω | 26.31 | — |
| β | 0.000 | −0.165 |
| D10 | 1.20 | 2.72 |
| D12 | 18.15 | 16.64 |

Figure 8:
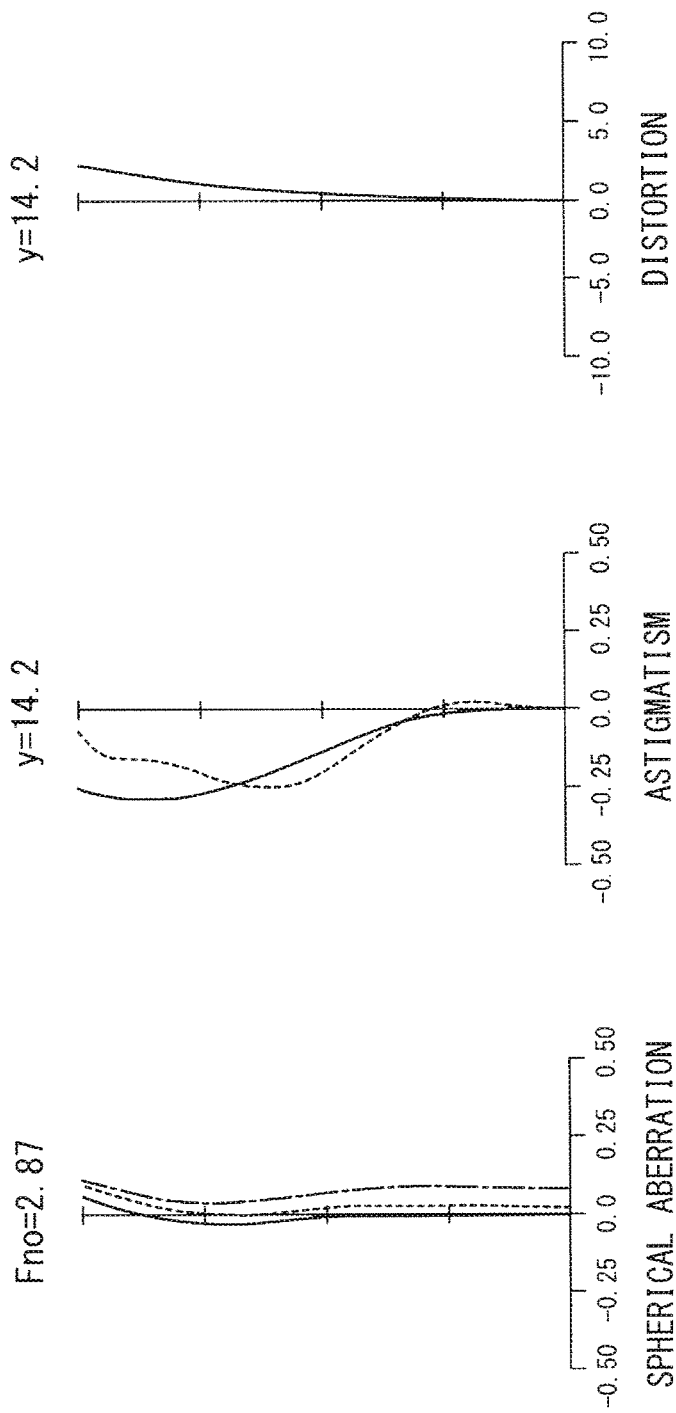
FIG. 8 is a diagram illustrating spherical aberration, astigmatism, and distortion in a condition that the image pickup lens is in focus on an object at infinite distance in a numerical example in which specific numerical values are applied to the third embodiment.
Figure 9:
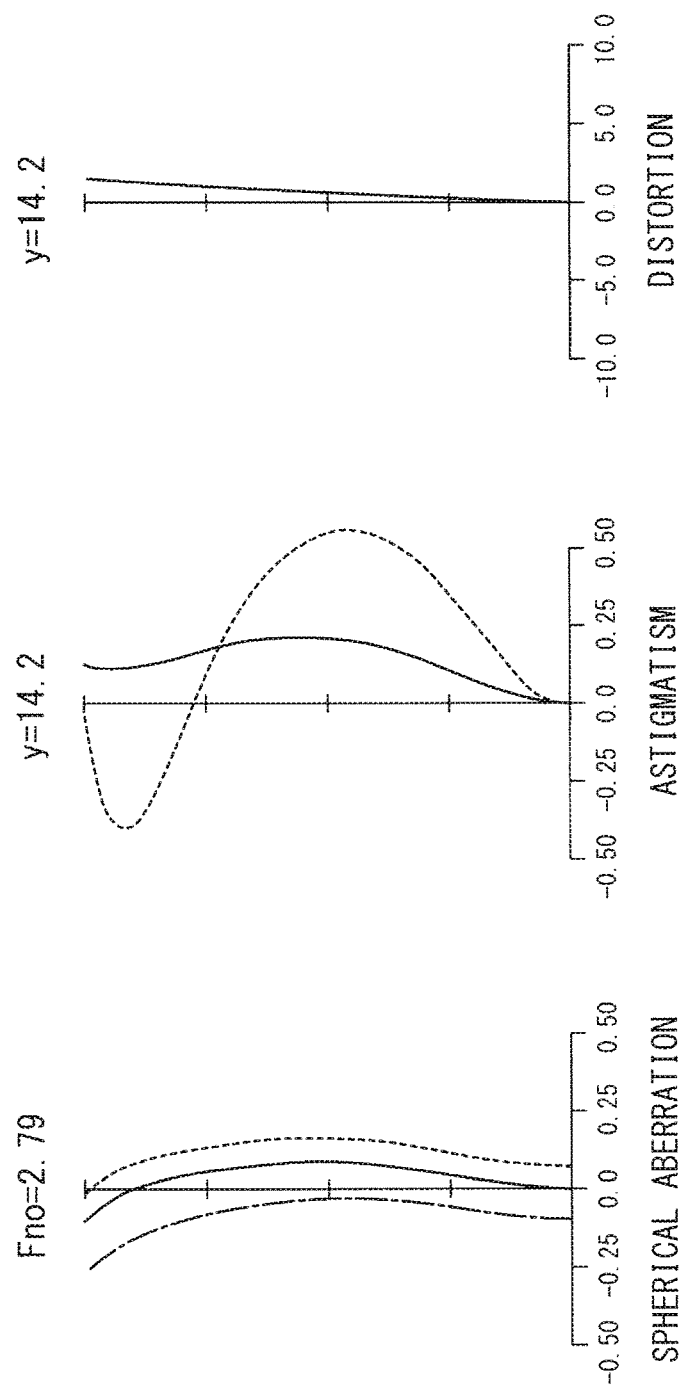
FIG. 9 is a diagram illustrating spherical aberration, astigmatism, and distortion in a condition that the image pickup lens is in focus on an object at a short distance in the numerical example in which the specific numerical values are applied to the third embodiment.

FIG. 8 illustrates spherical aberration, astigmatism, and distortion in a condition that the image pickup lens is in focus on an object at infinite distance in Numerical Example 3. FIG. 9 illustrates spherical aberration, astigmatism, and distortion in a condition that the image pickup lens is in focus on an object at a short distance in Numerical Example 3.

In FIGS. 8 and 9, a solid line in the diagram of spherical aberration shows values of the d line (587.56 nm), a solid line in the diagram of astigmatism shows values in a sagittal image plane of the d line, a dashed line in the diagram of astigmatism shows values in a meridional image plane of the d line, and values of the d line are shown in the diagram of distortion. "y" represents an image height in the diagrams of astigmatism and distortion.

As can be clearly seen from the respective aberration diagrams, various types of aberration are favorably corrected in Numerical Example 3, and the image pickup lens in Numerical Example 3 has superior imaging performance.

Fourth Embodiment

Figure 10:
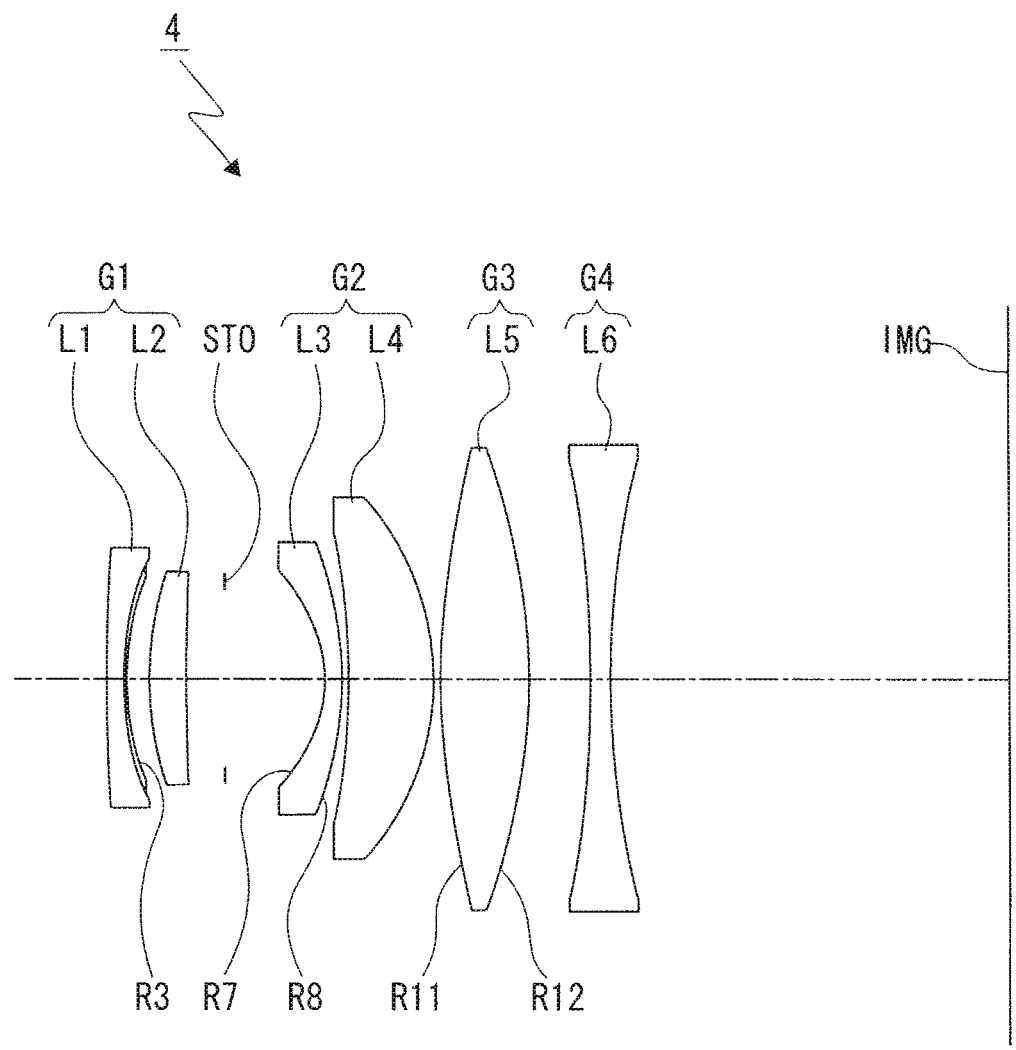
FIG. 10 is a diagram illustrating a lens configuration of an image pickup lens according to a fourth embodiment.

FIG. 10 illustrates a lens configuration of the image pickup lens 4 according to the fourth embodiment of the present technology.

The first lens group G1 is configured of a first lens L1 and a second lens L2 arranged in order from the object side to the image side. The first lens L1 has a meniscus shape with a convex face on the object side, and has negative refractive power. The second lens L2 has a meniscus shape with a convex face on the object side, and has positive refractive power. An aspherical resin lens is provided on an image-sided face of the first lens L1.

The second lens group G2 is configured of a third lens L3 and a fourth lens L4 arranged in order from the object side to the image side. The third lens L3 has a meniscus shape with a concave face on the object side, and has negative refractive power. The fourth lens L4 has a meniscus shape with a convex face on the image side, and has positive refractive power.

The third lens group G3 is configured of a fifth lens L5. The fifth lens L5 has a biconvex shape, and has positive refractive power.

The fourth lens group G4 is configured of a sixth lens L6. The sixth lens L6 has a biconcave shape, and has negative refractive power.

An aperture stop STO is arranged between the first lens group G1 and the second lens group G2.

An image plane IMG is placed on the image side of the fourth lens group G4.

Table 10 shows lens data of Numerical Example 4 in which specific numerical values are applied to the image pickup lens 4 according to the fourth embodiment.

TABLE 10

| Face number | R | D | Nd | νd |
|---|---|---|---|---|
| 1 | 100.00 | 0.70 | 1.567 | 42.84 |
| 2 | 12.91 | 0.08 | 1.534 | 41.71 |
| 3 (ASP) | 11.31 | 0.90 | | |
| 4 | 12.47 | 1.62 | 1.804 | 46.50 |
| 5 | 249.73 | 1.44 | | |
| 6 (STO) | infinity | 4.05 | | |
| 7 (ASP) | −6.02 | 0.75 | 1.689 | 31.16 |
| 8 (ASP) | −15.92 | 0.30 | | |
| 9 | −29.58 | 3.50 | 1.729 | 54.67 |
| 10 | −10.66 | 0.20 | | |
| 11 (ASP) | 22.10 | 3.75 | 1.821 | 42.71 |
| 12 (ASP) | −22.80 | D12 | | |
| 13 | −50.87 | 0.85 | 1.847 | 23.78 |
| 14 | 35.79 | D14 | | |

In the image pickup lens 4, an image-sided face (a third face) of the first lens L1 in the first lens group G1, both faces (a seventh face and an eighth face) of the third lens L3 in the second lens group G2, and both faces (an eleventh face and a twelfth face) of the fifth lens L5 in the third lens group G3 are aspherical. Table 11 shows values of the 4th-order, 6th-order, 8th-order, and 10th-order aspherical surface coefficients A4, A6, A8, and A10 of the aspherical surfaces in Numerical Example 4 together with values of the conic constants κ.

TABLE 11

| Face number | κ | A4 | A6 | A8 | A10 |
|---|---|---|---|---|---|
| 3 | 0.0000 | −3.8544E−05 | −9.2082E−07 | 8.5792E−09 | −4.6597E−11 |
| 7 | −0.6857 | −5.3036E−04 | 2.5638E−05 | 9.0164E−08 | −2.5389E−08 |
| 8 | 0.0000 | −6.8401E−04 | 4.1185E−05 | −8.6459E−07 | 6.1843E−09 |
| 11 | −0.9098 | −2.1495E−04 | 1.8334E−06 | 2.0282E−09 | −6.7158E−11 |
| 12 | 0.0000 | 3.4624E−05 | −1.7483E−06 | 3.5493E−08 | −1.8422E−10 |

Table 12 shows values of F number Fno, a total focal length f of the image pickup lens, and a half angle of view ω in Numerical Example 4. Table 12 also shows shooting magnification β and variable spacing in a condition that the image pickup lens is in focus on an object at infinite distance and in a condition that the image pickup lens is in focus on an object at a short distance in Numerical Example 4.

TABLE 12

| | Focus on object at infinite distance | Focus on object at short distance |
|---|---|---|
| Fno | 2.89 | — |
| f | 20.42 | — |
| ω | 35.98 | — |
| β | 0.000 | −0.122 |
| D12 | 1.20 | 2.41 |
| D14 | 17.59 | 16.38 |

Figure 11:
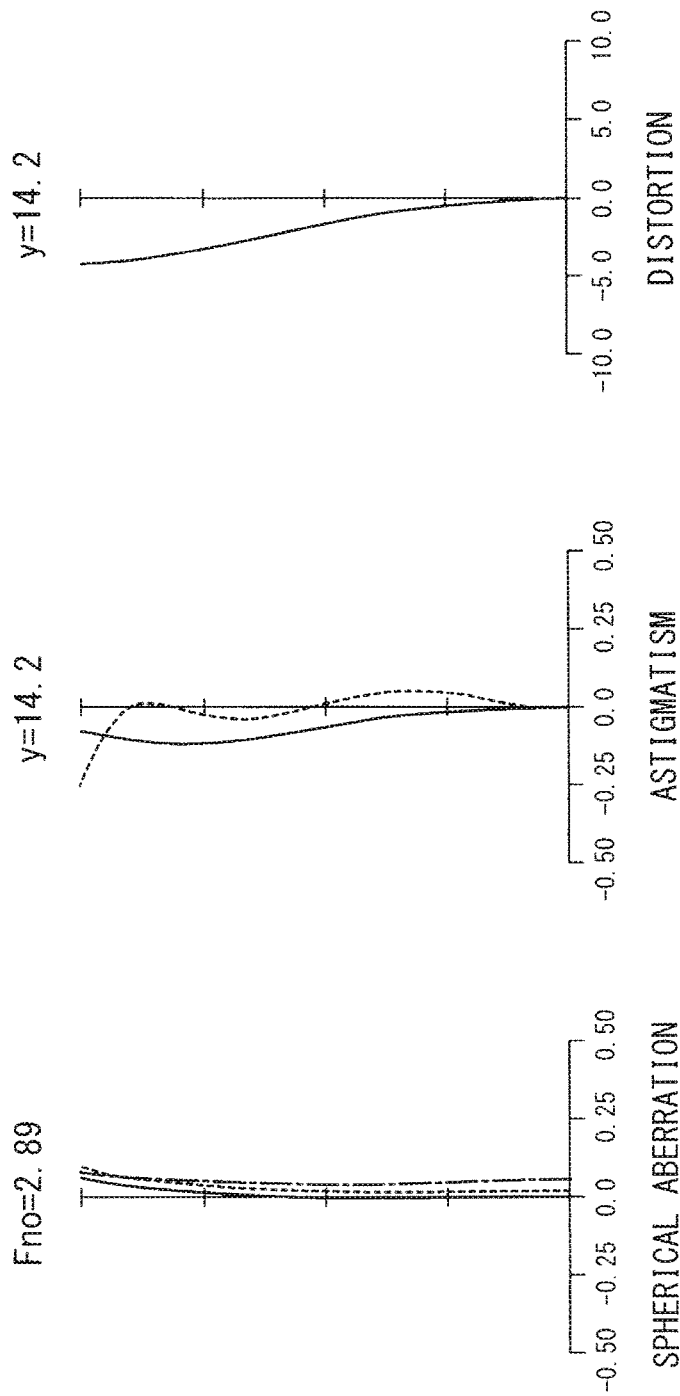
FIG. 11 is a diagram illustrating spherical aberration, astigmatism, and distortion in a condition that the image pickup lens is in focus on an object at infinite distance in a numerical example in which specific numerical values are applied to the fourth embodiment.
Figure 12:
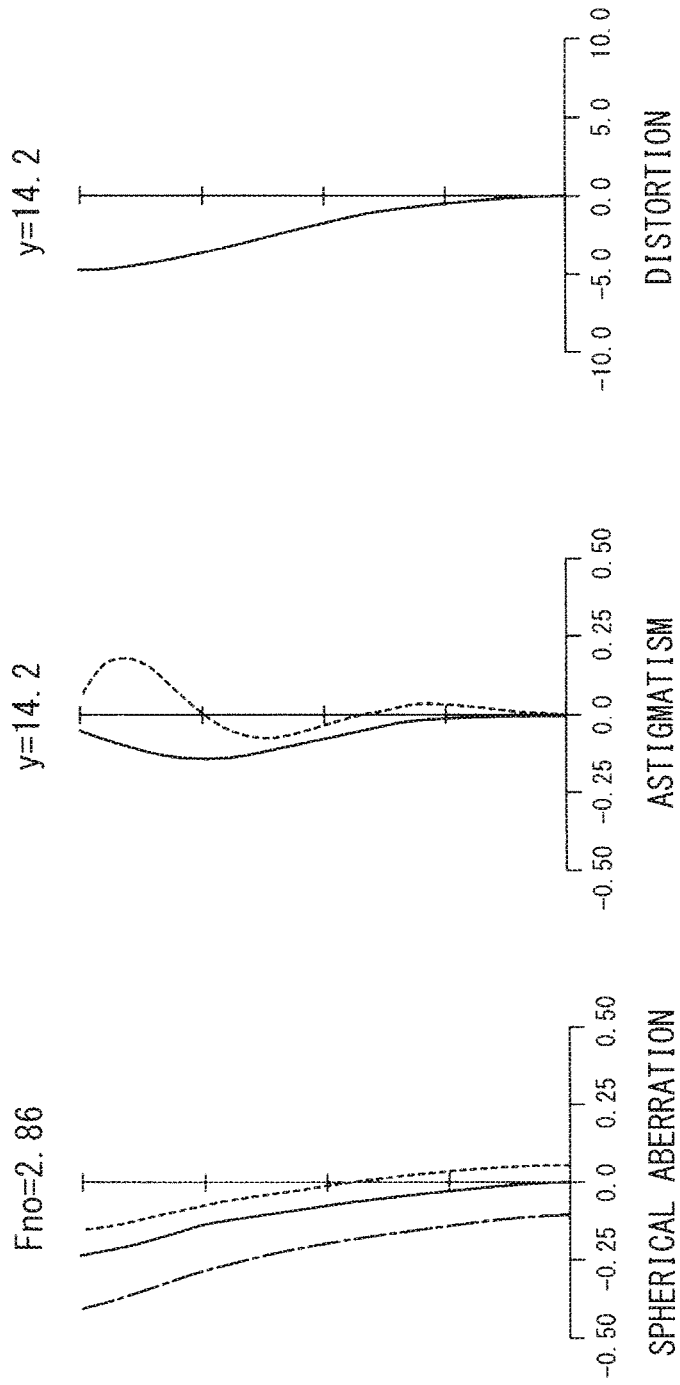
FIG. 12 is a diagram illustrating spherical aberration, astigmatism, and distortion in a condition that the image pickup lens is in focus on an object at a short distance in the numerical example in which the specific numerical values are applied to the fourth embodiment.

FIG. 11 illustrates spherical aberration, astigmatism, and distortion in a condition that the image pickup lens is in focus on an object at infinite distance in Numerical Example 4. FIG. 12 illustrates spherical aberration, astigmatism, and distortion in a condition that the image pickup lens is in focus on an object at a short distance in Numerical Example 4.

In FIGS. 11 and 12, a solid line in the diagram of spherical aberration shows values of the d line (587.56 nm), a solid line in the diagram of astigmatism shows values in a sagittal image plane of the d line, a dashed line in the diagram of astigmatism shows values in a meridional image plane of the d line, and values of the d line are shown in the diagram of distortion. "y" represents an image height in the diagrams of astigmatism and distortion.

As can be clearly seen from the respective aberration diagrams, various types of aberration are favorably corrected in Numerical Example 4, and the image pickup lens in Numerical Example 4 has superior imaging performance.

[Respective Values in Conditional Expressions of Image Pickup Lens]

Description will be given below of the respective values in the conditional expressions of the image pickup lenses according to the above-described embodiments of the present technology.

Table 13 shows respective values in the conditional expressions (1) to (4) in Numerical Examples 1 to 4 of the image pickup lenses 1 to 4.

TABLE 13

| | | Example 1 | Example 2 | Example 3 | Example 4 |
|---|---|---|---|---|---|
| | f | 20.51 | 20.60 | 28.13 | 20.42 |
| | f4 | −28.88 | −21.57 | −17.39 | −24.70 |
| Conditional expression (1) | f/f4 < −0.35 | −0.71 | −0.96 | −1.62 | −0.83 |
| | f3 | 16.4 | 13.4 | 12.2 | 14.2 |

TABLE 13-continued

| | | Example 1 | Example 2 | Example 3 | Example 4 |
|---|---|---|---|---|---|
| Conditional expression (2) | 0.8 < f/f3 < 4.0 | 1.3 | 1.5 | 2.3 | 1.4 |
| | f2 | −327.73 | −77.18 | −45.62 | −112.60 |
| Conditional expression (3) | −1.20 < f/f2 < −0.03 | −0.06 | −0.27 | −0.62 | −0.18 |
| | f1 | 50.0 | 50.0 | 46.0 | 51.0 |
| Conditional expression (4) | 0.3 < f/f1 < 1.0 | 0.4 | 0.4 | 0.6 | 0.4 |

As can be clearly seen from Table 13, the image pickup lenses 1 to 4 satisfy the conditional expressions (1) to (4).

[Configuration of Image Pickup Apparatus]

In the image pickup apparatus according to an embodiment of the present technology, the image pickup lens includes: the first lens group having positive refractive power; the second lens group having negative refractive power; the third lens group having positive refractive power; and the fourth lens group having negative refractive power, arranged in order from the object side to the image side. The fourth lens group is configured to travel along an optical axis through focusing operation.

In such a manner, the image pickup apparatus according to the embodiment of the present technology adopts rear-focus scheme, and whole of the image pickup lens does not travel along the optical axis but the fourth lens group travels along the optical axis through the focusing operation. Therefore, weight of the focusing lens group is light. Also, an actuator for allowing the focusing lens group to travel is allowed to be small. Therefore, the focusing operation is achieved at high speed, and reduction in size is achieved.

Moreover, in the image pickup apparatus according to the embodiment of the present technology, the image pickup lens satisfies the following conditional expression (1), $$f/f4 < -0.35 \quad (1)$$

where f is a total focal length of the image pickup lens, and f4 is a focal length of the fourth lens group.

The conditional expression (1) defines a ratio between the total focal length of the image pickup lens and the focal length of the fourth lens group.

When a value of f/f4 is larger than the upper limit in the conditional expression (1), the negative refractive power of the fourth lens group is excessively weak. Therefore, the traveling range of the fourth lens group serving as the focusing lens group becomes large. Also, a degree of allowing the incident light rays to travel upward becomes small. Accordingly, the total length of the image pickup lens becomes disadvantageously large.

Accordingly, by allowing the image pickup lens to satisfy the conditional expression (1), the traveling range of the fourth lens group which is the focusing lens group becomes small. Also, the effect of allowing the incident light rays to travel upward is increased. Accordingly, reduction in total length of the image pickup lens is achieved while securing focusing operation at high speed.

[Example of Image Pickup Apparatus]

Figure 13:
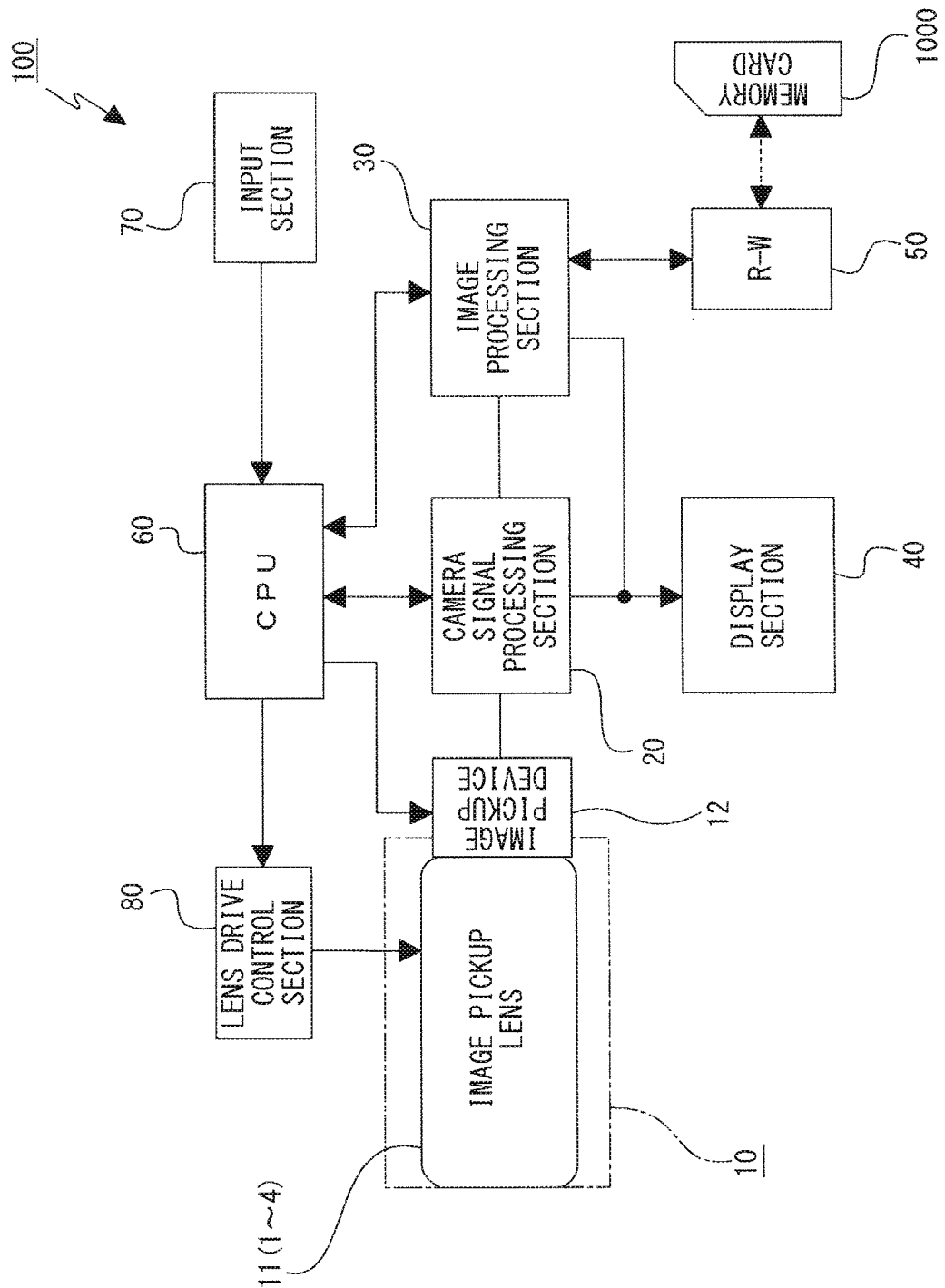
FIG. 13 is a block diagram illustrating an example of an image pickup apparatus.

FIG. 13 is a block diagram of a digital camera with interchangeable lenses as an example of the image pickup apparatus according to one embodiment of the present technology.

An image pickup apparatus (a digital camera) 100 includes a camera block 10, a camera signal processing section 20, and an image processing section 30. The camera block 10 has an image pickup function. The camera signal processing section 20 performs signal processing such as analog-to-digital conversion of an image signal of a shot image. The image processing section 30 performs recording-reproducing processing of the image signal. The image pickup apparatus 100 also includes a display section 40, an R-W (Reader-Writer) 50, a CPU (Central Processing Unit) 60, an input section 70, and a lens drive control section 80. The display section 40 may be an LCD (Liquid Crystal Display) that displays shot images, etc. The R-W 50 writes the image signal onto a memory card 1000, and reads the image signal from the memory card 1000. The CPU 60 controls whole of the image pickup apparatus 100. The input section 70 is configured of various switches etc. with which necessary operation is performed by a user. The lens drive control section 80 controls driving of the lens arranged in the camera block 10.

The camera block 10 may be included, for example, in an interchangeable lens. The camera block 10 may be configured, for example, of an optical system including an image pickup lens 11 (any of the image pickup lenses 1 to 4 to which one of the embodiments of the present technology is applied) and an image pickup device 12 such as CCD (Charge Coupled Device) and CMOS (Complementary Metal Oxide Semiconductor), etc.

The camera signal processing section 20 performs various types of signal processing, on an output signal from the image pickup device 12, such as conversion into a digital signal, noise removing, image quality correction, and conversion into luminance and color-difference signals.

The image processing section 30 performs compression coding and expansion decoding processing on the image signal based on a predetermined image data format, conversion processing on data specification such as resolution, etc.

The display section 40 has a function of displaying various data such as operation states of a user with respect to the input section 70 and shot images.

The R-W 50 writes the image data coded by the image processing section 30 onto the memory card 1000 and reads the image data recorded in the memory card 1000.

The CPU 60 serves as a control processing section that controls each circuit block provided in the image pickup apparatus 100. The CPU 60 controls each circuit block based on, for example, instruction input signal from the input section 70, etc.

The input section 70 may be configured, for example, of a shutter release button for performing shutter operation, a selection switch for selecting operation modes, etc. and outputs, to the CPU 60, the instruction input signal according to the user's operation.

The lens drive control section 80 controls, based on the control signal from the CPU 60, drive of the respective lenses in the image pickup lens 11.

The memory card 1000 may be, for example, a semiconductor memory that is attachable to and detachable from a slot connected to the R-W 50.

Description will be given below of operation in the image pickup apparatus 100.

In a standby state for shooting, under control of the CPU 60, the image signal of an image shot in the camera block 10 is outputted to the display section 40 through the camera signal processing section 20 and is displayed as a camera-through image. Further, when the input section 70 outputs the instruction input signal for zooming to the CPU 60, the CPU 60 outputs the control signal to the lens drive control section 80 and a predetermined lens in the image pickup lens 11 travels based on the control of the lens drive control section 80.

When an unillustrated shutter in the camera block 10 operates according to the instruction input signal from the input section 70, the camera signal processing section 20 outputs the image signal of the shot image to the image processing section 30. The image processing section 30 performs compression coding on the image signal, and thereby converts the image signal into digital data having a predetermined data format. The image processing section 30 outputs the converted data to the R-W 50, and the R-W 50 writes the data onto the memory card 1000.

For example, when the shutter release button in the input section 70 is pressed halfway, when the shutter release button is pressed all the way for recording (shooting), etc., the lens drive control section 80 allows the predetermined lens in the image pickup lens 11 to travel based on the control signal from the CPU 60, and thereby, the focusing operation is performed.

When the image data recorded in the memory card 1000 is reproduced, the R-W 50 reads predetermined image data from the memory card 1000 according to the operation with respect to the input section 70, and the image processing section 30 performs extension decoding processing on the read image data. Thereafter, a reproduction image signal is outputted to the display section 40 and the display section 40 displays the reproduced image.

[Others]

In the image pickup lens and the image pickup apparatus according to the embodiments of the present technology, other optical components such as a lens having no refractive power may be provided in addition to the first to fourth lens groups. In this case, the image pickup lens according to the embodiment of the present technology substantially has a four-group lens configuration configured of the first to fourth lens groups.

It is possible to achieve at least the following configurations from the above-described example embodiments and the modifications of the disclosure.

[1] An image pickup lens including:
a first lens group having positive refractive power;
a second lens group having negative refractive power;
a third lens group having positive refractive power; and
a fourth lens group having negative refractive power, arranged in order from an object side to an image side, the fourth lens group being configured to travel along an optical axis through focusing operation, wherein
following conditional expression (1) is satisfied, $$f/f4 < -0.35 \quad (1)$$

where f is a total focal length of the image pickup lens, and f4 is a focal length of the fourth lens group.

[2] The image pickup lens according to [1], wherein following conditional expression (2) is satisfied, $$0.8 < f/f3 < 4.0 \quad (2)$$

where f3 is a focal length of the third lens group.

[3] The image pickup lens according to [1] or [2], wherein following conditional expression (3) is satisfied, $$-1.20 < f/f2 < -0.03 \quad (3)$$

where f2 is a focal length of the second lens group.

[4] The image pickup lens according to any one of [1] to [3], wherein a most-object-sided face in the second lens group has a concave shape on the object side, and a most-image-sided face in the second lens group has a convex shape on the image side.

[5] The image pickup lens according to [4], wherein the second lens group includes a plurality of meniscus lenses.

[6] The image pickup lens according to any one of [1] to [5], wherein following conditional expression (4) is satisfied, $$0.3 < f/f1 < 1.0 \quad (4)$$

where f1 is a focal length of the first lens group.

[7] The image pickup lens according to any one of [1] to [6], wherein the third lens group includes an aspherical lens having positive refractive power.

[8] The image pickup lens according to any one of [1] to [7], wherein the fourth lens group consists essentially of one negative lens.

[9] An image pickup apparatus with an image pickup lens and an image pickup device, the image pickup device being configured to convert an optical image formed by the image pickup lens into an electric signal, the image pickup lens including:
a first lens group having positive refractive power;
a second lens group having negative refractive power;
a third lens group having positive refractive power; and
a fourth lens group having negative refractive power, arranged in order from an object side to an image side, the fourth lens group being configured to travel along an optical axis through focusing operation, wherein
following conditional expression (1) is satisfied, $$f/f4 < -0.35 \quad (1)$$

where f is a total focal length of the image pickup lens, and f4 is a focal length of the fourth lens group.

Shapes of the respective sections and numerical values shown in the above-described embodiments are mere specific examples to carry out the embodiments of the present technology, and should not be used to limitedly understand the technical scope of the present technology.

It should be understood by those skilled in the art that various modifications, combinations, sub-combinations, and alterations may occur depending on design requirements and other factors insofar as they are within the scope of the appended claims or the equivalents thereof.

What is claimed is:

1. An image pickup lens comprising:
a first lens group having positive refractive power;
a second lens group including two lenses and having negative refractive power;
a third lens group having positive refractive power; and
a fourth lens group having negative refractive power, arranged in order from an object side to an image side, the fourth lens group being configured to travel along an optical axis through focusing operation, wherein
following conditional expression (1) is satisfied, $$f/f4 < -0.35 \quad (1)$$

where f is a total focal length of the image pickup lens, and f4 is a focal length of the fourth lens group.

2. The image pickup lens according to claim 1, wherein following conditional expression (2) is satisfied, $$0.8 < f/f3 < 4.0 \quad (2)$$

where f3 is a focal length of the third lens group.

3. The image pickup lens according to claim 1, wherein following conditional expression (3) is satisfied, $$-1.20 < f/f2 < -0.03 \quad (3)$$

where f2 is a focal length of the second lens group.

4. The image pickup lens according to claim 1, wherein a most-object-sided face in the second lens group has a concave shape on the object side, and a most-image-sided face in the second lens group has a convex shape on the image side.

5. The image pickup lens according to claim 4, wherein the second lens group includes a plurality of meniscus lenses.

6. The image pickup lens according to claim 1, wherein following conditional expression (4) is satisfied, $$0.3 < f/f1 < 1.0 \quad (4)$$

where f1 is a focal length of the first lens group.

7. The image pickup lens according to claim 1, wherein the third lens group includes an aspherical lens having positive refractive power.

8. The image pickup lens according to claim 1, wherein the fourth lens group consists essentially of one negative lens.

9. An image pickup apparatus with an image pickup lens and an image pickup device, the image pickup device being configured to convert an optical image formed by the image pickup lens into an electric signal, the image pickup lens comprising:
a first lens group having positive refractive power;
a second lens group including two lenses and having negative refractive power;
a third lens group having positive refractive power; and a fourth lens group having negative refractive power, arranged in order from an object side to an image side, the fourth lens group being configured to travel along an optical axis through focusing operation, wherein following conditional expression (1) is satisfied, $$f/f4 < -0.35 \quad (1)$$

where f is a total focal length of the image pickup lens, and f4 is a focal length of the fourth lens group.

10. The image pickup apparatus according to claim 9, wherein following conditional expression (2) is satisfied, $$0.8 < f/f3 < 4.0 \quad (2)$$

where f3 is a focal length of the third lens group.

11. The image pickup apparatus according to claim 9, wherein following conditional expression (3) is satisfied, $$-1.20 < f/f2 < -0.03 \quad (3)$$

where f2 is a focal length of the second lens group.

12. The image pickup apparatus according to claim 9, wherein a most-object-sided face in the second lens group has a concave shape on the object side, and a most-image-sided face in the second lens group has a convex shape on the image side.

13. The image pickup apparatus according to claim 12, wherein the second lens group includes a plurality of meniscus lenses.

14. The image pickup apparatus according to claim 9, wherein following conditional expression (4) is satisfied, $$0.3 < f/f1 < 1.0 \quad (4)$$

where f1 is a focal length of the first lens group.

15. The image pickup apparatus according to claim 9, wherein the third lens group includes an aspherical lens having positive refractive power.

16. The image pickup apparatus according to claim 9, wherein the fourth lens group consists essentially of one negative lens.

\* \* \* \* \*